United States Patent [19]

Bos et al.

[11] Patent Number: 5,638,201
[45] Date of Patent: Jun. 10, 1997

[54] OPTICALLY ACTIVE DIFFRACTIVE DEVICE

[76] Inventors: Philip J. Bos, 6806 Windsor Dr., Hudson, Ohio 44236; David L. Johnson, 421 Ivan Dr., Kent, Ohio 44240; Jianmin Chen, 254 W. Elm St., Apt 4., Kent, Ohio 44240; Hemasiri K. Vithana, 1405 Stratford Dr., Kent, Ohio 44240; William E. Glenn, 650 Royal Plaza Dr., Ft. Lauderdale, Fla. 33301; Carvel E. Holton, 19780 Princewood Dr., Jupiter, Fla. 33458; Brett E. Smith, 1860 Tom-A-Toe Rd., Boynton Beach, Fla. 33462

[21] Appl. No.: 445,051

[22] Filed: May 19, 1995

[51] Int. Cl.⁶ .................................. G02F 1/1337
[52] U.S. Cl. ................. 349/129; 349/130; 349/128
[58] Field of Search .................. 359/75, 76, 77, 359/78

[56] References Cited

U.S. PATENT DOCUMENTS

| | | | |
|---|---|---|---|
| 5,309,264 | 5/1994 | Lien et al. | 359/77 |
| 5,473,455 | 12/1995 | Koike et al. | 359/78 |
| 5,504,604 | 4/1996 | Takatori et al. | 359/75 |

FOREIGN PATENT DOCUMENTS

| | | |
|---|---|---|
| 106624 | 2/1988 | Japan. |
| 88520 | 9/1989 | Japan. |
| 273509 | 3/1990 | Japan. |
| 5-173138 | 7/1993 | Japan ................................ 359/78 |
| 5-203951 | 8/1993 | Japan ................................ 359/77 |

OTHER PUBLICATIONS

"New Development in Alignment Layers for Active Matrix TN–LCDs", pp. 78–85, Faculty of Technology, Tokyo University of A&T, Data of Publication (undated).

"Multi–domain homeotropic liquid crystal display for active matrix application", IBM Research Division, pp. 21–24, Date of Publication (undated).

"Polymer Stabilized Amorphous TM–LCD", pp. 484–487, Stanley Electric Co., Ltd; Dainippon Inc. & Chemicals, Inc.; and Faculty of Technology, Tokyo University, Date of Publication (undated).

"Crystals for Schlieren Optical Projection Systems", M.W. Fritsch, et al., Date of Publication (undated).

"Nematic Homogeneous Alignment by Photo Depolymerization of Polyimide", Masaki Hasegawa and Yoichi Taira, pp. 213–216, Date of Publication (undated).

Yoshikazu Hori, et al., *Field–Controllable Liquid Crystal Phase Grating*, IEEE Transactions on Electron Devices, vol. ED–26, No. 11, Nov. 1979.

*Primary Examiner*—William L. Sikes
*Assistant Examiner*—James A. Dudek

[57] ABSTRACT

A liquid crystalline diffractive light valve for use in a diffractive projection system. The liquid crystal cell includes substrates treated to provide alternating stripes which cooperate with the liquid crystal to form liquid crystal domains extending across the thickness of the cell that will produce a 180° phase difference in light emerging from adjacent domains, irrespective of the polarization of incident light.

44 Claims, 2 Drawing Sheets

OPTICALLY ACTIVE DIFFRACTIVE DEVICE

This application was made in part with government support under cooperative agreement number DMR 89-20147 awarded by the National Science Foundation. The Government has certain rights in this invention.

BACKGROUND OF THE INVENTION

Light-valve projectors using liquid crystal panels as a light modulator are an attractive way to produce large screen images. Consumer or theater high definition television displays require screen sizes in excess of about 50 inches. In order to have enough brightness to overcome ambient illumination for consumer displays of this size a light output on the order of 1000 lumens is needed, while theater sized displays require roughly 5000 to 10,000 lumens. Currently available low cost light valve projectors fall short of the light output required for consumer displays, and higher priced HDTV projectors fall short of the light output required for a normal size theater. Thus, light-valve projectors using liquid crystal cells as diffractive light valves or diffraction gratings appear to be the only option for economical, bright displays of this size.

Liquid crystalline light valves for use as phase or diffraction gratings in projection systems require that the light passing through different regions of the liquid crystal cell exit the regions of the device out of phase. The phase difference between the light emerging from the device in different regions causes diffraction of the light into various orders, creating a pattern of bright spots or regions, e.g., the first, second, third order diffraction spots, and dark regions caused by the destructive interference of light emerging from different regions out of phase. Spatial filters such as louvers disposed between the viewing surface and the liquid crystal device then pass the selected higher diffraction orders of the diffraction pattern onto the projected scene, and block the zero or other unwanted orders. When the various regions of the device are divided into electrically addressable pixels, the diffraction of light through the device can be modulated to produce images.

Liquid crystalline tunable birefringence devices (TBD's) can be used to produce a diffractive light valve or diffraction grating. However, such devices require polarizers which inherently reduce the light transmission, rendering it essentially no better than a conventional twisted nematic (TN) type light valve. Twisted nematic light valve devices have also been proposed wherein the liquid crystal has a 90° and 180° twist across the cell. However, such devices exhibit only about a $\pi/2$ phase difference between ON and OFF states, such that useful efficiency can only be achieved in a reflective type display. In addition, both such approaches have the disadvantage of requiring high resolution patterned electrodes. To replace the patterned electrodes, photo-induced alignment has been considered for chirped-gratings. However, practical diffractive devices that operate at low voltages, are simple to construct, and that have high efficiencies have not been described. The transmissive modulation efficiency associated with TN cells is less than about 35%, with contrast ratios only on the order of about 100:1, and the transmissive modulation efficiency of patterned electrode devices is only about 60%, with contrast ratios on the order of 150:1. Accordingly, there is currently a need for a highly efficient liquid crystalline diffractive light valve that can be produced at low cost.

DISCLOSURE OF THE INVENTION

The present invention is directed to new liquid crystalline diffraction or phase gratings useful in light valve projectors. The inventive device exhibits excellent optical efficiency independent of the polarization of incident light, eliminating the need for polarizers and the associated light loss. The inventive device is also easier to manufacture than currently proposed devices and does not require high resolution patterned electrodes. As a result, the inventive device is especially suitable for use in the manufacture of large screen light valve projectors to produce bright, inexpensive large screen displays. To this end, the invention employs patterned alignment layers to create a diffractive device. In an especially preferred embodiment, the alignment layers take advantage of the property of optical activity to create a diffractive device with exceptional performance properties and simplicity of implementation.

To improve the modulation efficiency i.e., the percentage of transmitted light, the inventive device provides a highly efficient diffraction grating created in the area of each pixel of a liquid crystal cell. The diffraction efficiency, i.e., the amount of light diffracted into all orders, is a function of the phase shift produced by the liquid crystal device. If the phase shift between regions of the pixel is exactly $\pi$ radians, or 180°, then the pixel will in theory produce 100% diffraction efficiency with all energy diffracted into the odd orders. If the output louver or other spatial filter is designed to pass the odd orders and block the zero and even orders, the percentage of transmitted light (modulation efficiency) approaches the limit set by the diffraction efficiency. Contrast in such a system is exceptionally high. The invention provides for the economical production of pixels in which the phase shift between adjacent regions of the pixel is approximately 180° regardless of the polarization of incident light on the pixel. As a result, the device does not require polarizers. Moreover, the diffraction achieved by the inventive device is a function of the orientation of the liquid crystal induced by the treatment of the inner surfaces of the cell substrates, such that complicated patterned electrodes are not required. Thus, the means for addressing the liquid crystal may be any type known, such as transparent electrodes as are commonly formed from indium tin oxide (ITO) which may be continuous on at least one cell substrate, active matrix thin film transistors or MIM's, passive matrix and so on.

These and other advantages are achieved in accordance with the invention by providing a liquid crystal device in which the substrate surfaces are patterned into alternating domains, preferably extending in substantially parallel stripes across the light modulating portion of the device. By properly orienting the liquid crystal at the inner substrate surfaces in alternating stripes, the liquid crystal forms domains extending from one substrate to the other. Light of any given polarization incident on adjacent domains that is initially in phase will emerge from adjacent domains approximately 180° out of phase. By bounding adjacent portions of the stripes with electrodes, thin film transistors or the like to form pixels, different regions of the cell can be made to transmit or diffract light in response to various inputs. When incorporated into a projection apparatus, the device can create images. To this end, the device can be prepared to form adjacent stripes or domains effective to produce a 180° phase difference between light emerging from adjacent domains in several ways according to the invention.

In one embodiment, the stripes essentially form a series of alternating tunable birefringence devices within the cell wherein the liquid crystals at the cell surfaces are substantially orthogonal to each other in adjacent domains. Thus, light entering adjacent domains will encounter different indices of refraction. Since the projection of the directors of the liquid crystal in a given stripe or domain are parallel across the thickness of the cell, the light will not be rotated as it proceeds through a given domain. Instead, a given polarization component of light will proceed at different rates through each domain to produce a phase shift there between. Under appropriate field conditions, the light will emerge from adjacent domains approximately 180° out of phase and be diffracted, irrespective of the polarization of the incident light.

In particular, if the plane of the cell is the x-y plane, and if in one domain or stripe nematic liquid crystals are oriented along the y-axis or vertically |, and in an adjacent domain or stripe the nematic liquid crystals are oriented along the x-axis or horizontally —, then the vertical component of light entering the first domain will see the extraordinary index of refraction ($n_e$), but will see the ordinary index of refraction ($n_o$) of the liquid crystal in the second domain. Likewise, the horizontal component will see $n_o$ in the first stripe and $n_e$ in the second. As a result, light will travel at different speeds through each domain, irrespective of polarization. Since $n_e$ is a function of voltage, light exiting adjacent domains will be diffracted when a voltage is applied (if necessary) such that the relation $\Delta nd/\lambda$ is a multiple of ½, wherein d is the thickness of the cell, $\Delta n$ is the difference between the ordinary and extraordinary indices of refraction and $\lambda$ is the wavelength of light. When the liquid crystal is perfectly homeotropically aligned $\Delta n$ is zero and no diffraction will occur.

There are numerous liquid crystal alignment configurations or combinations thereof suitable for producing the foregoing effect in accordance with the invention. First, as alluded to above, the liquid crystal molecules can be homogeneously aligned generally parallel to the substrates, but perpendicular to each other from one stripe or domain to the next. As used herein, homogeneous alignment refers to when substantially all of the liquid crystal molecules adjacent a substrate in the homogeneously aligned region lie generally parallel to one another, and substantially parallel to the substrate. This not only includes when the molecules lie exactly parallel to the substrate, but also when the molecules are slightly tilted with respect to the substrate such that they have a so called pretilt angle. Depending upon the manner of aligning the liquid crystal, the molecules may have a very slight pretilt angle inherently produced by the alignment procedure, or the method and materials may be selected to intentionally provide a desired pretilt angle.

To produce the noted orthogonal homogeneous alignment from domain to domain, a first of the substrates may be coated with, for example, polyimide and rubbed in one direction to provide homogeneous alignment of the liquid crystal in one direction. Through the use of masking techniques known to those of ordinary skill in the art, such as photolithography, alternating stripes may then be masked and the substrate again rubbed to provide homogeneous alignment of the liquid crystal in the unmasked stripes in the direction orthogonal to the first rubbing direction. The liquid crystal at the other substrate may be aligned in the same manner and the cell assembled such that the stripes of like liquid crystal orientation on opposite substrates are aligned. In this way, the liquid crystal between matching stripes on opposite substrates will retain the orientation of the liquid crystals at the substrate surfaces to produce uniform domains across the thickness of the cell. Preferably, the stripes of like orientation on opposite substrates have been rubbed coaxially but in opposite directions to compensate for any inherent pretilt that may be produced by the rubbing.

In a variant of this configuration alluded to above, the liquid crystals on one or both surfaces may, and frequently will, have an intentionally induced pretilt angle with respect to the cell surface to reduce the occurrence of so called anti-tilt disclinations. Importantly, any such pretilt angle must be such that the liquid crystal directors in a given domain all lie in substantially the same or parallel planes from one substrate to the other. This is conveniently accomplished by rubbing in opposite directions as noted above. However, this method has the drawback of requiring both surfaces to be patterned and carefully aligned with high precision. In addition, the voltages required for operation can be quite high.

In a second configuration that solves the problem of needing to pattern and align both substrates, each stripe forms a so called hybrid cell between the substrates. Here, one of the substrates is treated to promote homeotropic alignment of the liquid crystal molecules. As with the preceding configuration, the liquid crystal directors in a given domain all lie in substantially the same or parallel planes from one substrate to the other. This has the advantage of simplified manufacture and is conducive to the use of active matrices, such as thin film transistors (TFT's) or metal-insulator-metal (MIM) devices, in the cell design.

A variant on this configuration suitable for producing the desired effect involves the use of nematic liquid crystal having negative dielectric anisotropy. Here one substrate surface is treated to promote tilted homeotropic alignment of the liquid crystal. The liquid crystal molecules are tilted in adjacent domains or stripes such that, as with the foregoing configuration, the projection on the cell surface of the liquid crystal directors of the liquid crystal at the cell surface in adjacent domains are substantially orthogonal to each other. Thus, under sufficient field conditions, the orientation of the directors of the liquid crystal in a given stripe or domain are all substantially parallel from one substrate to the other, such that light entering adjacent domains will encounter different indices of refraction to fulfill the relation $\Delta nd/\lambda=\tfrac{1}{2}$ or some multiple thereof.

The foregoing configurations have the drawback of requiring voltages that are not easily reached by active matrix TFT devices. It is highly desirable to achieve the polarization independent diffractive effect associated with the invention with the same voltages used by conventional active matrix TN devices. It has been found that this can be accomplished using a new concept in diffractive gratings that is based on the optical activity achievable with nematic liquid crystals. The application of optical activity to a diffractive device results in unexpectedly superior performance. The surprising feature of its operation is that in adjacent stripes their is actually no difference in the optical path length, rather the device operates by rotating the polarization component of light in adjacent stripes to producing the desired 180° phase difference in light emerging from adjacent domains or stripes.

Here, a twisted nematic structure is established in adjacent domains to produce an effective phase shift of a given polarization component of light emerging from the cell, rather than the actual phase shift associated with the configurations heretofore mentioned. To this end, the liquid crystal in adjacent domains or stripes exhibits a twisted nematic structure extending from one substrate to the other wherein the twist direction or twist sense in adjacent domains is in opposite directions. As with the configurations described above, there is a 90° difference in the orientation of the projection on the cell surface of the liquid crystal directors midway between the substrates in adjacent domains. Thus, if the liquid crystal in one domain is twisted to rotate a polarization component of incident light 90° in one direction, and the liquid crystal in an adjacent domain is twisted to rotate that polarization component of incident light 90° in the opposite direction, light entering adjacent domains initially in phase will emerge from the other side π radians, or 180° out of phase. Again, this effect is observed regardless of the polarization of the incident light. Under field conditions effective to untwist the liquid crystal in the domains, the phase retardation for light passing through adjacent stripes is the same for a given polarization. Since the optical activity of the device is destroyed as soon as the liquid crystal director in the center of the cell is perpendicular to the substrates, only a relatively low voltage is necessary to switch between diffractive and non-diffractive states.

Suitable liquid crystal alignment configurations for producing a 180° phase difference in accordance with this aspect of the invention may be achieved by treating the surfaces of the cell to provide adjacent stripes with varying pretilt orientations effective to provide the desired twist sense. In particular, one of the substrates is treated to provide alternating domains or stripes wherein the orientation of the projection on the cell surface of the liquid crystal at the cell surface in adjacent stripes is approximately 180°. Although the liquid crystal in adjacent stripes on this substrate all lie in generally parallel planes, the liquid crystals are tilted in opposite directions, such that the tilt orientation in a plane orthogonal to the cell surface of liquid crystal molecules in adjacent stripes form mirror images of each other. The opposite substrate is treated to promote homogeneous alignment of the liquid crystal orthogonal to the liquid crystal on the first substrate. The liquid crystal molecules on this substrate preferably also have a pretilt angle, although it will generally be the case that any such pretilt will be of a uniform direction across the substrate. Generally, higher pretilts are preferred in order to stabilize the domain boundaries of opposite twist sense.

An opposite twist sense may also be obtained in adjacent domains using nematic liquid crystal having negative dielectric anisotropy. Here, both substrates are treated to promote a tilted homeotropic alignment, wherein the tilt direction and angle in adjacent stripes or domains on the substrate will be as described above, but the twisted nematic structure extending between substrates will occur in a field-on condition.

Alignment techniques readily adaptable to the instant application by those of ordinary skill in the art in view of the instant disclosure are disclosed in, for example, Hiroshima et at., *Proceedings of the SID*, Vol. 25(4), pp 287–92 (1984); Lackner et al., *SID 90 Digest*, pp 98–101 (1990); Koike et al., *SID 92 Digest*, pp798–801 (1992); Seki et at., *Mol. Cryst. Liq. Cryst.*, Vol. 199, pp. 151–58 (1991); S. Kobayashi et al., IDRC Digest, p. 78 (1994); *Liquid Crystals Applications and Uses*, Vol. 3, edited by Bahadur, World Scientific Pub. Co. (1992); Lien et al., *Proceedings of the 13th IDRC*, p 21 (1993); and Takatori et al., *Proceeding of the 12th IDRC*, p 91 (1992), all of which are incorporated herein by reference.

Thus, in accordance with the invention there is provided a liquid crystalline diffractive light modulating device comprising nematic liquid crystal material disposed between first and second transparent substrates defining cell walls and including means for addressing said liquid crystal material. The first substrate is treated to provide a plurality of domains in which the liquid crystal adjacent said first substrate in a first of said domains is oriented in a different direction than the liquid crystal adjacent said first substrate in a second of said domains. The substrates cooperate with said liquid crystal to form a plurality of liquid crystal domains extending between said first and second substrates. The alignment of the liquid crystal adjacent said second substrate is different than the alignment of said liquid crystal adjacent said first substrate. In this way, light incident on said first and second domains through one said substrate and in phase, exits said first and second domains through the other of said substrates out of phase, irrespective of the polarization of said incident light.

Preferably, in the first and second domains, there is an approximately 90° difference in the projection on the cell surface of the liquid crystal director of the liquid crystal approximately midway between said substrates. Thus, light incident on said first and second domains through one said substrate and in phase, exits said first and second domains through the other of said substrates approximately 180° out of phase, irrespective of the polarization of said incident light. Still more preferably, the domains are arranged in alternating, substantially parallel, adjacent stripes on said first substrate extending substantially across the entire light modulating portion of said device. In one embodiment the means for addressing said liquid crystal material include a continuous transparent electrode disposed on said first substrate. In another embodiment, the means for addressing said liquid crystal includes an active matrix disposed on said second substrate.

In one aspect of the invention, the liquid crystal adjacent said first substrate in each said first and second domains is tilted at an angle of from about 0.5° to about 25° with respect to said substrate. Preferably, the liquid crystal molecules adjacent both substrates are tilted at an angle of from about 0.5° to about 25° with respect thereto.

In another aspect of the invention the liquid crystal has negative dielectric anisotropy, and the first substrate is treated to promote a tilted homeotropic alignment of said liquid crystal, wherein the projection on the cell surface of the directors of the liquid crystal in said first and second domains are substantially orthogonal. In another aspect of the invention, the liquid crystal molecules are homogeneously aligned such that the projection of the directors on the cell surface of the liquid crystal adjacent said first substrate in one of said first and second domains are oriented substantially orthogonally to the projection of the directors on the cell surface, of the liquid crystal adjacent said first substrate in the other of said domains. Preferably, the second substrate is treated to promote homeotropic alignment of the liquid crystal.

In another embodiment, the liquid crystal molecules at the surface of said first substrate in said first and second domains are tilted toward each other or, alternatively, tilted away from each other, and the liquid crystal molecules at the surface of said second substrate are oriented orthogonal to the liquid crystal molecules adjacent said first substrate and have a unidirectional pretilt angle of from about 0.5° to about 25° with respect to said second substrate, whereby in said first and second domains the liquid crystal exhibits a twisted nematic liquid crystal structure having opposite twist sense extending between said first and second substrates.

In a preferred embodiment, the invention provides a liquid crystalline diffractive light modulating device wherein the first substrate is treated to provide a plurality of domains in which the projection on the cell surface of the directors of the liquid crystal adjacent said first substrate in a first of said domains are oriented approximately 180° with respect to the projection on the cell surface of the directors of the liquid crystal adjacent said first substrate in a second of said domains, said substrates cooperating with said liquid crystal in said first and second domains to form twisted nematic liquid crystal domains having opposite twist sense extending between said first and second substrates. Still more preferably, there is an approximately 90° difference in the projection on the cell surface of the liquid crystal director of the liquid crystal approximately midway between said substrates in said domains, whereby light incident on said first and second domains through one said substrate and in phase, exits said domains through the other of said substrates approximately 180° out of phase, irrespective of the polarization of said incident light. In one aspect of this embodiment the liquid crystal molecules at the surface of said first substrate in said first and second domains are tilted toward each other, and in another aspect they are tilted away from each other. Preferably, the second substrate is treated to promote homogeneous alignment of said liquid crystal having a unidirectional pretilt angle of from about 0.5° to about 25° with respect to said second substrate.

In another preferred embodiment, there is provided a liquid crystalline diffractive light modulating device wherein said first substrate being treated to provide a plurality of domains in which the projection of the directors on the cell surface of the liquid crystal adjacent said first substrate in a first of said domains are oriented substantially orthogonally to the projection of the directors on the cell surface, of the liquid crystal adjacent said first substrate in a second of said domains, said substrates cooperating with said liquid crystal to form a liquid crystal domain structure extending between said first and second substrates. In one aspect of this embodiment, the second substrate is also treated to provide a plurality domains in which the projection on the cell surface of the directors of the liquid crystal adjacent said second substrate in a first of said domains are oriented substantially orthogonally to the projection on the cell surface of the directors of the liquid crystal adjacent said second substrate in a second said domain. The first and second domains of said second substrate are disposed with respect to said first and second domains of said first substrate such that the orientation of the directors of the liquid crystal in one said domain all lie in substantially the same or parallel planes across the thickness of the cell. Preferably, the liquid crystal in each said first and second domain adjacent each said first and second substrate are tilted at an angle of from about 0.5° to about 25° with respect to said substrate. Still more preferably, the second substrate is treated to promote homeotropic of the liquid crystal. In another aspect of this embodiment, the liquid crystal has negative dielectric anisotropy, and the first substrate is treated to promote a tilted homeotropic alignment of said liquid crystal. Preferably, the liquid crystal molecules on are tilted at an angle of from about 0.5° to about 25° with respect to the substrate normal.

In another aspect of the invention there is provided a method of making a liquid crystalline diffractive device comprising providing first and second substrates to define cell walls, and including means for addressing a liquid crystal material; treating said first substrate with a first alignment layer to provide at least first and second domains adapted to promote different orientations of a liquid crystal material adjacent said domains; treating said second substrate with a second alignment layer adapted to promote an orientation of a liquid crystal adjacent said second substrate that is different than the orientation promoted by said first and second domains of said first substrate, and to cooperate with said first alignment layer and a liquid crystal disposed therebetween, to produce liquid crystal domains extending between said substrates; and, disposing a nematic liquid crystal material between said substrates to form liquid crystal domains extending between said substrates.

In one embodiment, the method comprises treating said first substrate such that said first and second domains of said first alignment layer promote a homogeneous or a tilted homeotropic alignment of adjacent liquid crystal molecules in which said molecules adjacent said first and second domains tilt in the opposite directions. Preferably, said second substrate is treated such that said second alignment layer promotes a unidirectional homogeneous or tilted homeotropic alignment of adjacent liquid crystal molecules in said first and second domains.

In another embodiment, the method comprises treating said first substrate such that said first and second domains of said first alignment layer promote a homogeneous or a tilted homeotropic alignment of adjacent liquid crystal molecules in which the projection on the cell surface of the directors of said molecules adjacent said first and second domains are orthogonal. Preferably, said second substrate is treated such that said second alignment layer promotes homeotropic alignment of adjacent liquid crystal molecules.

A preferred method according to the invention comprises the steps of providing first and second substrates including means for addressing a liquid crystal material to define cell walls; treating said first substrate with a first alignment layer to provide a plurality of domains in which a first said domain will promote a tilted orientation of a liquid crystal material adjacent said domain in one direction, and a second said domain will promote a tilted orientation of a liquid crystal adjacent said domain in an opposite direction; treating said second substrate with a second alignment layer adapted to cooperate with said first alignment layer and a liquid crystal disposed therebetween, to produce first and second twisted nematic liquid crystal domains having opposite twist sense extending between said substrates; and, disposing a nematic liquid crystal material between said substrates to form first and second liquid crystal domains extending between said substrates in which the projection of the directors on the substrate surface, of the liquid crystal in said first and second domains is substantially orthogonal.

One aspect of this preferred method comprises coating said first substrate with polyimide, unidirectionally rubbing said substrate, masking at least a portion of said substrate and, thereafter, unidirectionally rubbing said substrate in the opposite direction. Another aspect of this preferred method comprises obliquely evaporating a silicon oxide of the formula $SiO_x$, wherein x is an integer, onto the surface of said substrate, masking at least a portion of said substrate and, thereafter, obliquely evaporating said silicon oxide the opposite direction to said first evaporation.

Another preferred method according to the invention comprises the steps of providing first and second substrates including means for addressing a liquid crystal material to define cell walls; treating said first substrate with a first alignment layer to provide a plurality of domains in which a first said domain will promote an orientation of a liquid crystal material adjacent said domain orthogonally to a liquid crystal orientation promoted by a second said domain; treating said second substrate with a second alignment layer adapted to cooperate with said first alignment layer and a liquid crystal disposed therebetween, to produce first and second liquid crystal domains extending between said substrates; and, disposing a nematic liquid crystal material between said substrates to form first and second liquid crystal domains extending between said substrates in which the projection of the directors on the substrate surface, of the liquid crystal in said first and second domains is substantially orthogonal. Preferably, said second substrate is treated to promote homeotropic alignment of said liquid crystal material. In one aspect of this preferred method, said treating of said first substrate comprises coating said substrate with polyimide, unidirectionally rubbing said substrate, masking at least a portion of said substrate and, thereafter, unidirectionally rubbing said substrate in a direction perpendicular to said first rub. In another aspect, said treating of said first substrate comprising obliquely evaporating a silicon oxide of the formula $SiO_x$, wherein x is an integer from one to three, onto the surface of said substrate, masking at least a portion of said substrate and, thereafter, obliquely evaporating said first evaporation. Many additional features, advantages and a fuller understanding of the invention will be had from the following detailed description of preferred embodiments and the accompanying drawings.

DETAILED DESCRIPTION OF THE PREFERRED EMBODIMENTS

Figure 1:
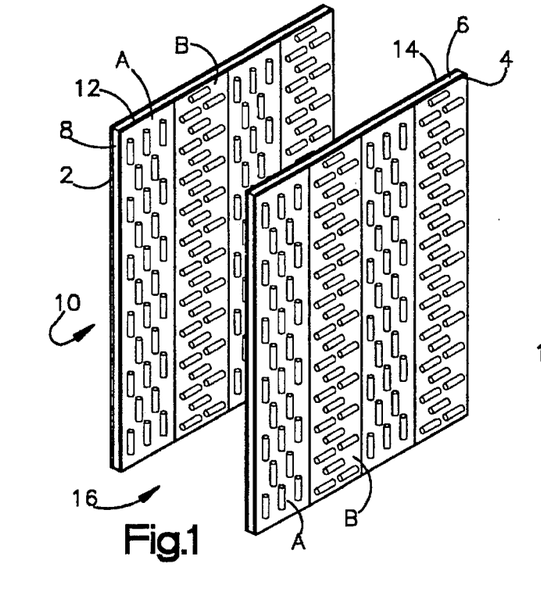
FIG. 1 is a diagrammatic perspective representation of a portion of a pair of substrates constructed in accordance with the invention.

The preferred diffractive liquid crystal phase gratings according to the invention are shown in the drawings. Referring to FIG. 1, the liquid crystal cells for use as a diffractive light valve according to the invention include a pair of opposing substrates 2, 4 that are sealed around their edges and separated by spacers (not shown) to accommodate a liquid crystal material 16 therebetween as is known in the art. As shown, the cell 10 includes continuous transparent electrodes 6, 8 disposed on opposing substrates 2, 4, and alignment layers 12, 14 disposed on the electrodes. The alignment layers 12 and/or 14 are prepared so as to create a series of alternating stripes on one or both of the substrates 2, 4 to create alternating domains A, B within the cell in which the liquid crystal exhibits different orientations in adjacent domains. It is to be understood that although as shown, the domains are depicted as being rather large with respect to the substrate, in practice they are quite small. Preferably, each domain will be on the order of about 0.5 to 500 μm wide, and still more preferably about 20 to 75 μm wide. By coupling the electrodes or other addressing means overlying portions of two or more stripes, to suitable drive electronics, pixels can be selectively actuated to produce images in a diffractive light valve projection system. One advantage of the invention is that a plurality of generally continuous pixel sized transparent electrodes may be used, rather than high resolution patterned electrodes that must be processed to correspond precisely to each stripe.

Alignment layers 12, 14 are designed to provide for different liquid crystal orientations in adjacent domains or stripes such that the liquid crystal in one domain A will cause light passing therethrough to exit the cell π radians, or 180°, out of phase with light exiting an adjacent domain B. In the practice of the invention there are essentially two principal liquid crystal properties that may be relied upon to accomplish this. The first is birefringence, in particular tunable birefringence, wherein the liquid crystal in adjacent domains A, B is oriented such that a given polarization component of light entering a domain A will encounter one of the ordinary $(n_o)$ or extraordinary $(n_e)$ indices of refraction, and that same polarization component entering an adjacent domain B will encounter the other of $n_o$ or $n_e$. Surprisingly, the second property that may be adapted to the claimed invention is optical activity, wherein adjacent domains exhibit twisted nematic liquid crystal structures having opposite twist senses, such that a given polarization component of light entering one domain A will be rotated in one direction, while the same polarization component of light entering an adjacent domain B will be rotated in the opposite direction. When the period of rotation is 90° across the thickness of the cell, light of a given polarization will emerge from the cell 180° out of phase regardless of polarization. In each case, under appropriate field conditions there will be an approximately 90° difference between the projection of the liquid crystal directors on the cell surface, of the liquid crystal in the center of the cell in adjacent domains A and B.

Suitable nematic liquid crystals include those having positive dielectric anisotropy as are commonly used in the industry, for example, E7, ZLI-4792, E48, E31, E80, TL202, TL203, TL204 and TL205 manufactured by EM Industries, and those having negative dielectric anisotropy also well known in the art, such as ZLI-4330, ZLI-2830 and ZLI-2806, also available from EM Industries. Other nematic liquid crystals and liquid crystal mixtures suitable for use in the invention would be known to those of ordinary skill in the art in view of the instant disclosure. In contrast to many twisted nematic devices, no chiral additive is necessary.

Although one advantage of the device according to the invention is that both substrates 2, 4 can include continuous electrodes 6, 8, at each pixel, it will be understood that the material can be addressed in various ways. For example, instead of being addressed by externally activated electrodes, the liquid crystal can be addressed by an active matrix, a multiplexing scheme or other type of circuitry, all of which will be evident to those working in the art.

Figure 2:
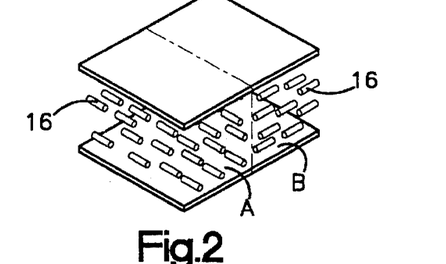
FIG. 2 is a diagrammatic perspective representation of the liquid crystal structure in a cell constructed in accordance with FIG. 1.

A preferred cell design according to the invention is shown in FIGS. 1 and 2, wherein the liquid crystal 16 on each substrate surface is treated for homogeneous alignment substantially parallel to the substrate surfaces, but oriented orthogonally in adjacent domains. As seen in FIG. 1, the substrates 2, 4 include alignment layers 12, 14 that have each been patterned to form alternating stripes A, B in which the liquid crystal is oriented at right angles from stripe to stripe. The liquid crystal orientation at the surface of substrate 2 in stripe A corresponds to the liquid crystal orientation at the surface of substrate 4 in stripe A. Likewise, the orientation of the liquid crystal at opposing substrate surfaces in stripe B is the same. As shown in FIG. 2, this results in a liquid crystal structure extending from one substrate 2 to the other substrate 4 wherein the liquid crystals in a given domain are all oriented in the same or parallel planes across the thickness of the cell, to create liquid crystal domains A, B wherein the liquid crystal in one domain is orthogonal to the liquid crystal in an adjacent domain across the thickness of the cell.

With the domain orientation shown in FIGS. 1 and 2, light passing through the cell in adjacent domains will exit the cell from adjacent domains out of phase and be diffracted, regardless of the polarization of incident light. In particular, light incident on substrate 2 may be broken down into horizontal and vertical polarization components. The vertical polarization component passing into domain A will encounter the effective extraordinary index of refraction of the liquid crystal 16 in that domain, but will encounter the ordinary index of refraction of the liquid crystal 16 in domain B. Likewise, the horizontal component passing through domain A will encounter the ordinary index of refraction of the liquid crystal 16 in domain A, and the effective extraordinary index of refraction of the liquid crystal in domain B. Thus, when a voltage is applied to the device by electrodes 6, 8, such that the relation $\Delta nd/\lambda$ is a multiple of ½, wherein d is the thickness of the cell, $\Delta n$ is the difference between the effective extraordinary index of refraction and the ordinary index of refraction, and $\lambda$ is the wavelength of light, any polarization of light exiting adjacent domains A, B will be 180° out of phase and be diffracted. When the voltage is high enough to homeotropically align the liquid crystal molecules 16, or more generally when $\Delta nd/\lambda$ is zero or an integer, light will not see any difference in the index of refraction between adjacent domains and will pass through the cell undiffracted.

Surface treatments suitable to produce the striped alignment shown in FIG. 1 would be apparent to those of ordinary skill in the art in view of this disclosure. In one such embodiment, the substrates are coated with polyimide or analogous material and mechanically rubbed to provide the desired alignment as is known in the art. For example, a clean indium tin oxide (ITO) coated glass substrate is spin coated with polyimide (PI) material, such as is commercially available from Nissan under the designation PI7311, to a thickness of about 550Å. The substrate is then soft baked at, for example, 100° C. for about a minute to remove solvent, and then hard baked at, for example, 275° C. for about 2 hours to cure the polyimide. Next, each of the coated substrates is first rubbed in one direction to provide homogeneous alignment of the liquid crystal in one direction. Once the substrates have been uniformly rubbed, the alternating domains are created through the use of photolithography. Those regions or stripes that are desired to retain the orientation produced by the first rub are masked with a photoresist material as is known in the art, for example as is commercially available from Shipley under the designation S1400-31, which has been patterned to create the desired stripe pattern across the substrate surface. Kits for providing patterned rubbed alignment and suitable for use in the invention are also known in the art and commercially available, such as from JSR Microelectronics Inc., using the photoresist JALS-381 and alignment material AL3046. Thereafter, the substrates are rubbed perpendicular to the first rub, and the photoresist removed. In this way, alternating domains are created in which the liquid crystals are oriented orthogonally to each other in adjacent domains. When stripes of like orientation on opposite substrates are aligned with one another as shown in FIG. 1, a positive nematic liquid crystal will assume the generally parallel orientation from one substrate to the other shown in FIG. 2.

It will be understood that mechanical rubbing of various polyimides and analogous materials may produce a slight pretilt depending upon the material. In fact, as discussed below, such pretilts are frequently desirable. When the rubbing produces a pretilt, either inherently or by design, it is desirable to rub the opposite substrate in the opposite direction so as to reduce the propensity of the liquid crystal to splay or twist as it progresses across the cell, thereby eliminating so called reverse tilt disclinations. Thus, for example, the rub direction used to create stripe A on substrate 2 in FIG. 1 would be upward toward the top of the page, and the rub used to create stripe A on substrate 4 would be downward toward the bottom of the page.

Figure 3:
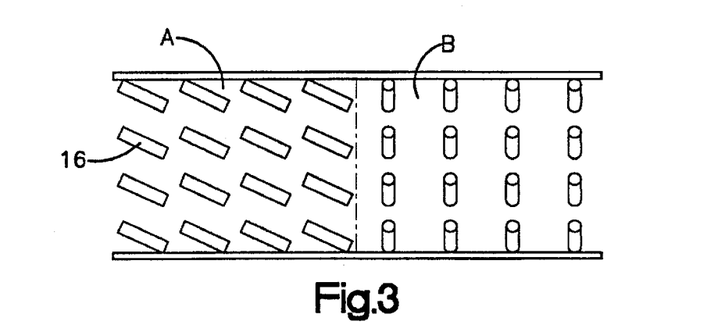
FIG. 3 is a diagrammatic plan representation of a variation of a cell configured in accordance with FIG. 1 wherein the liquid crystal molecules have a pretilt angle.

Thus, in a preferred variant, the liquid crystal in stripes A, B of FIG. 1 is not homogeneously aligned exactly parallel to the substrates 2, 4, but instead may have a so called pretilt angle with respect thereto. A pretilt angle has the advantage of reducing the tendency of the liquid crystal to form antitilt disclinations. Preferably, the molecules will have a pretilt angle with respect to the substrate of from about 0.5° to about 30°, with angles of from about 6° to about 8° being typical, and angles of at least about 8° to 10° being preferred. Importantly, as seen in FIG. 3, the molecules on a given substrate, in a given domain, all tilt in the same direction with respect to the substrate, which is opposite the tilt direction of the liquid crystal in the corresponding stripe on the opposing substrate. Advantageously, this orientation will result from the antiparallel rubbing described above. In this way, the liquid crystal directors all lie in substantially the same or parallel planes across the thickness of the cell in a given domain when no field is applied.

Two key factors in selecting a suitable polyimide material are pretilt angle and compatibility to the photolithography process. In fact, polyimide materials specifically designed to provide particular pretilt angles when used with specified liquid crystals are now widely commercially available. Suitable polyimides would be known to those of ordinary skill in the art in view of this disclosure, and are commercially available from, for example, Nissan under the tradename Nissan PI7311, or Dupont under the designation Dupont 2555. The manner of deposition, baking, rubbing and the like of these and other materials are known to those of ordinary skill in the art. A preferred material is Nissan PI7311 polyimide, which produces a pretilt angle of about 8° using the liquid crystal E7. For a more detailed discussion of the type of polyimide to use for a particular liquid crystal pretilt angle and the effect of rubbing on the orientation of liquid crystals adjacent the cell wall substrates, see S. Kobayashi et al., *New Development in Alignment Layers for Active Matrix TN-LCD's*, IDRC Digest, p. 78 (1994), which is incorporated herein by reference.

Notably, in the preferred manner of preparing a cell according to the invention, it is desirable to cure the polyimide with a hard baking temperature in excess of the curing temperature prescribed by the manufacturer. It has been found that higher hard baking temperatures tend to yield less defects after the second rub. Thus, when selecting a suitable polyimide, it is also desirable to choose those having a relatively low curing temperature.

Pretilt angles may also be obtained by various methods of oblique deposition of silicon oxides ($SiO_x$), wherein x is an integer from 1 to 3, as would be apparent to those of ordinary skill in the art in view of the instant disclosure. In particular, the various masking steps and desired liquid crystal orientations are the same as with the preparation of a cell using rubbed polyimide, except that the deposition and rubbing steps are replaced by oblique evaporation of an $SiO_x$ layer.

Suitable evaporation angles will range from about 4° to about 10° with respect to the substrate, and preferably about 5°. After the first evaporation process, the photolithography mask is applied and the substrate rotated so that the second evaporation process produces the desired orthogonal orientation from domain to domain.

For a discussion of other vacuum oblique evaporation techniques adaptable for use in the invention, see K. Hiroshima and H. Obi, SID Digest, p. 287 (1984); K. Hiroshima, Jpn. J. Appl. Phys. 21, L761 (1982) and Janning, *Appl. Phys. Lett.*, 21 p173 (1972), incorporated herein by reference.

Figure 4:
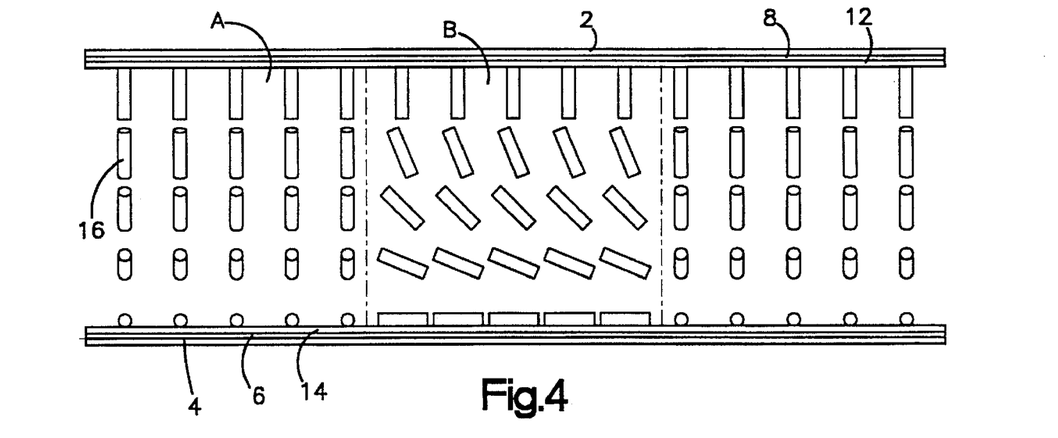
FIG. 4 is a diagrammatic plan representation of another variation of a cell configured in accordance with FIG. 1 wherein the liquid crystal molecules adjacent one substrate have a homeotropic alignment.

Another configuration of a tunable birefringence type device adaptable for use in accordance with the invention is a hybrid cell as seen in FIG. 4. In this embodiment, one substrate is treated to provide the striped homogeneous arrangement shown on the substrate 2 in FIG. 1, and the other substrate is treated to promote homeotropic alignment. Homeotropic alignment is easily obtained by coating the substrate with, for example, silanes or surfactants, as is known in the art. One such suitable material is Nissan RN722. Treating one substrate for homeotropic alignment advantageously eliminates the need to rub both substrates and to thereafter align them. As a result, the substrate treated for homeotropic alignment, which does not require rubbing, is especially conducive to the use of an active matrix, such as a thin film transistor arrangement.

As seen in FIG. 4, the liquid crystal molecules adjacent substrate 2 are homogeneously aligned, preferably with a pretilt, with the molecules in domain A oriented substantially perpendicular to the molecules in domain B. At the opposite substrate 4, the liquid crystal molecules are all generally homeotropically aligned. As the liquid crystal molecules progress across the cell from substrate 2 to substrate 4, they gradually tilt toward a homeotropic alignment with the molecules in a given domain all oriented in substantially the same or parallel planes across the thickness of the cell. As with the cell depicted in FIG. 1, horizontally polarized light entering substrate 2 will see $n_o$ in domain A, while vertically polarized light will encounter $n_e$, and vise versa in domain B. Since light of an arbitrary polarization may be decomposed into vertical and horizontal polarization components, under appropriate field conditions $(n_e - n_o)(d)/\lambda$ will be $n/2$ where n is an odd integer and maximum diffraction of light will result. If $n/2$ is equal to an integer or zero, then light will not be diffracted.

In another embodiment, a nematic liquid crystal having negative dielectric anisotropy may be used. In this embodiment, both surfaces are treated to promote a tilted homeotropic alignment, with the direction of the tilt in one domain being orthogonal to the direction of the tilt in an adjacent domain. In this way, the projection of the liquid crystal directors on the cell surfaces in adjacent domains are orthogonal to each other, and under appropriate field conditions, there is an approximately 90° difference in the projection on the cell surface of the directors of the liquid crystals midway between substrates in adjacent domains. Conceptually, the orientation of the liquid crystal on opposite substrates and in adjacent domains is analogous to the configuration shown in FIG. 3, except that the liquid crystals are slightly tilted with respect to the cell normal, rather than the substrate surfaces as depicted. Suitable surface treatments for obtaining a tilted homeotropic alignment at the cell surfaces are known to those of ordinary skill in the art.

Methods of oblique evaporation of silicon oxides ($SiO_x$) are especially preferred. As with the preceding embodiments, the striped array or domain configuration is obtained through the use of masking techniques such as photolithography. In particular, the method includes the steps of depositing a thin layer (300-550 Angstroms) of silicon monoxide SiO onto a rotating substrate by vacuum oblique evaporation. The surface topography of the layer is isotropic due to the symmetry of the deposition. The rotation of the substrate is stopped opposite to the desired pretilt direction and a second evaporation is given for a short period of time. This adds a small anisotropy to the surface topography and the liquid crystal molecules will tilt in that direction. By changing the thickness of the second layer it is possible to vary the pretilt angle from 0° to about 15°. It is also possible to obtain similar results by interchanging these two steps, i.e., first evaporating on a fixed substrate, then evaporating on a rotating substrate.

After the second evaporation the substrate is masked in an alternating striped pattern. The substrate is then rotated 90° and a third layer of evaporated material is deposited for a short period of time. This provides liquid crystal molecules adjacent the surface with tilted homeotropic alignment with the liquid crystals being tilted orthogonally in adjacent stripes. The second wall structure is treated in the same manner and the substrates aligned.

Figure 5A:
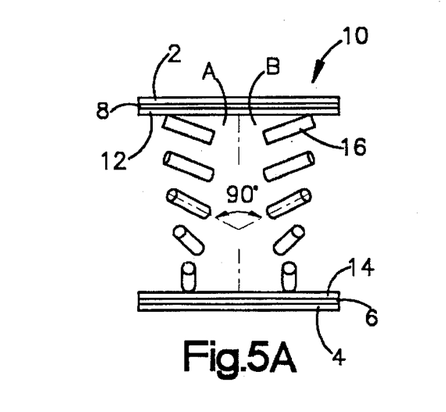
FIGS. 5a and 5b are diagrammatic plan representations of another pair of substrates constructed in accordance with the invention.
Figure 5B:
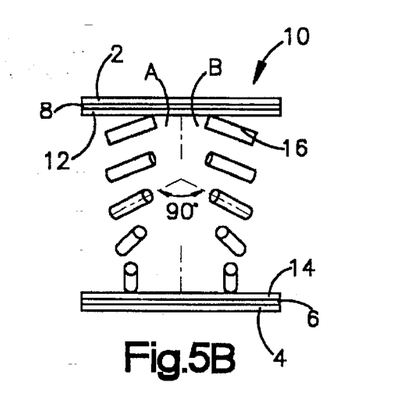

An especially preferred device according to the invention relies on the optical activity of the nematic liquid crystals to create alternating stripes or domains in which the liquid crystal in adjacent domains will rotate a given polarization of light in opposite directions to produce a phase difference in the light emerging from adjacent domains. As seen in FIGS. 5a and 5b, by treating the substrate surfaces 2, 4 to provide a desired orientation and pretilt of the liquid crystal in adjacent domains A, B, the liquid crystal will form a twisted nematic liquid crystal structure extending between the substrates. Depending upon the orientation and tilt direction of the liquid crystal in adjacent domains at the cell surfaces, the liquid crystal in adjacent domains will twist in opposite directions across the cell. When the liquid crystal in adjacent domains in the center of the cell is oriented at approximately right angles from domain to domain, light in adjacent domains will be rotated 90° in opposite directions to emerge from adjacent domains $\pi$ radians out of phase.

As with the birefringence embodiments, this cell will diffract light irrespective of the polarization of the incident light. The horizontal polarization component of incident light that is initially in phase entering adjacent stripes A, B will be rotated 90° in opposite directions and emerge from the cell out of phase. Likewise, the vertical polarization component of incident light that is initially in phase will also emerge 180° out of phase. When a field is applied sufficient to homeotropically align the liquid crystal, the optical activity of the device is destroyed and light will pass through the cell unaffected and will not be diffracted. Advantageously, the field need only be sufficient to align the liquid crystal in the center of the cell perpendicular to the substrates to destroy the optical activity of the device. As a result, only relatively low driving voltages are necessary for the efficient operation of the cell. Notably, the value of the birefringence of the medium does not matter under appropriate field conditions as long as the condition for optical activity is satisfied. This condition is quantified by the well known Gooch & Terry equation, *Electronics Letters*, Vol. 10, pp2–4 (1974). This equation is satisfied for optical activity where $\frac{1}{2} \sqrt{(1+(2\Delta nd/\lambda)^2)}$ is equal to an integer. Ideally, it is desirable for the cell to meet the conditions where this equation is equal to 1, which is the first interference minima.

A significant advantage of this configuration is that it only requires multiple rubs and masking on one substrate. The opposite substrate may be treated to provide a homogeneous alignment with a suitable pretilt angle in one direction across the entire substrate. This may be accomplished by rubbing a suitably selected polyimide designed to provide a desired pretilt. Alternatively, the substrate may be treated with oblique evaporation of silicon oxides as discussed above. This is especially desirable when a thin film transistor arrangement is desired for one of the substrates.

It is preferable that the liquid crystal at the surfaces of the substrates have a relatively high pretilt angle to overcome any propensity of the liquid crystal to twist in the wrong direction due to the competing forces at the domain boundaries. Thus, it is preferable that the liquid crystal tilt with respect to the substrates at an angle of from about 10° to about 25°. To this end, oblique evaporation of silicon oxides tends to provide the best results. As seen in FIGS. 5a and 5b, the liquid crystal in adjacent domains on substrate 4 is all uniformly aligned and tilted in the same direction, as shown coming out of the paper. To obtain the desired reverse twist sense in adjacent domains, the opposite substrate 2 is treated to provide a liquid crystal orientation in which the liquid crystal pretilt orientation in one domain A is a mirror image of the liquid crystal orientation of the liquid crystal in the adjacent domain B. This is accomplished by treating the surface of substrate 2 to provide a uniform homogeneous liquid crystal orientation with the desired pretilt in one direction, then masking the substrate in the desired striped pattern through photolithography and rubbing or treating the surface to promote the homogeneous tilted alignment of the unmasked liquid crystal in the opposite direction. Thereafter, the photoresist is removed such that when the cell is filled with nematic liquid crystal having positive dielectric anisotropy, the liquid crystal will form a twisted nematic structure in adjacent domains A, B in which the liquid crystal has opposite twist sense.

Figure 6:
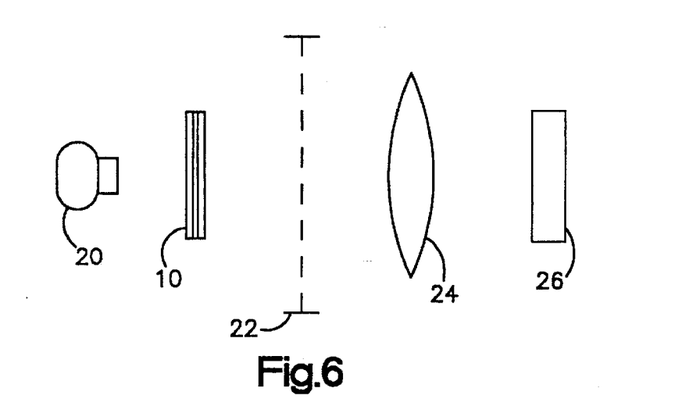
FIG. 6 is a simplified schematic of a test system employing a cell according to the invention.

By incorporating a device prepared in accordance with the foregoing into a projection system, excellent transmission efficiency may be obtained to provide bright, economical large size displays. A simplified system is depicted in FIG. 6. As shown, the liquid crystalline diffractive light valve 10 according to the invention is disposed between a light source 20 and a spacial filter, shown as louvers 22. Various regions of the light valve 10 are activated by drive electronics to switch the device between diffracting and non-diffracting modes. When in the diffracting mode, light from light source 20 will pass through device 10 and be diffracted into a diffraction pattern, with as much light as possible being diffracted into the odd orders. The zero and other unwanted orders are blocked by louver 22, and the even orders pass through the louvers and are focused by lens 24 onto the viewing surface 26. The diffraction efficiency of the device 10 according to the invention is capable of approaching 100%. As a result, the transmission efficiency from light source 20 onto viewing surface 26 also approaches 100%.

These and other features of the invention will be apparent from the following non-limiting examples.

EXAMPLE 1

A optically active cell was prepared using a polyimide alignment material available from Nissan under the tradename Nissan PI7311. The polyimide material was spin coated onto an ITO coated glass substrate (Donnoly Corp.) at 3500 rpm for 30 seconds to a thickness of 550 Å. The substrate was then soft baked at 100° C. for one minute to get rid of solvent, followed by hard baking at 275° C. for 2 hours to cure the polyimide. Next the polyimide coated substrate was rubbed in one direction at a speed of 3.5 ft/min. to provide a unidirectional homogeneous alignment. A photo-resist (Shipley S1400-31) was spin coated onto the substrate to a thickness of about 1.8 µm and baked at 100° C. for 1 minute, and a striped U.V. mask was used to form stripes approximately 75 µm wide, and spaced apart approximately 75 microns, and the photoresist cured by UV exposure from a NuArc 26-1K providing 3 mW/cm² for about 1 minute. The uncured photoresist was removed with developer (Shipley MF312-CD27), and the substrate washed and dried to create a mask to the second rubbing step.

The masked substrate was then rubbed again in the opposite direction, followed by removal of the photo-resist mask with acetone and water. The opposite ITO coated glass substrate was coated with a polyimide commercially available from Dupont under the tradename Dupont 2555, and rubbed uniformly in one direction. The substrates were then assembled such that the rubbing direction of the second substrate was orthogonal to the rubbing directions on the first substrate, separated by 6 micron spacers and vacuum filled with nematic liquid crystal E7.

Figure 7:
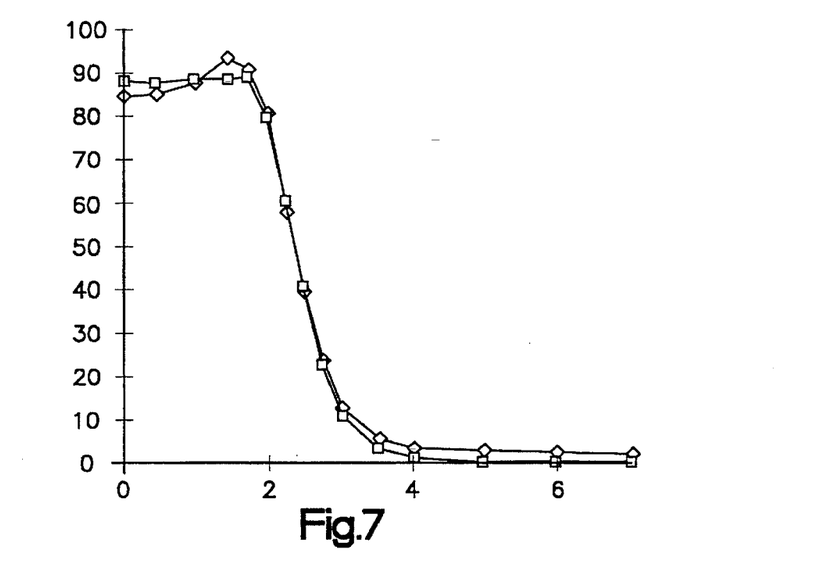
FIG. 7 is a plot of the percent transmission of varying wavelengths of incident light versus applied voltage of a cell according to the invention in the system of FIG. 6.

The cell was tested using the optical system shown in FIG. 6, wherein light source 20 is a laser, and the viewing surface 26 is a photodetector. The cell was illuminated with laser sources having wavelengths of 523 and 630 nm, respectively, to provide light with an angular spread of about 2° at the incident surface of the cell. In application, it is desirable for a light valve projector that nearly all of the light be diffracted into the odd orders when in the diffracting state, and that none of it is diffracted when in the nondiffracting state. Here, the louvers collected light from the first 7 orders. It is estimated that 2 to 3% of the light is diffracted into orders beyond 7 that are blocked. FIG. 7 shows the light diffracted by the test cell into the odd orders as a function of voltage, showing grey scale operation of the device. The peak transmission for green light (523 nm indicated by the diamonds) is 94% of the total amount of light transmitted by the cell, and the contrast ratio is 44 if the dark state voltage is taken to be 7 volts and the background is subtracted. For red light (630 nm indicated by the squares) the peak transmission is 88% and the contrast ratio is 372. The lower transmission for red light is due to the cell being slightly too thin to achieve the Gooch & Terry first interference minimum for 630 nm. The lower contrast ratio for green light is due to the louvers not being well matched to the green light diffraction pattern. Nevertheless, the cell demonstrated the ability to obtain exceptional diffraction efficiency and, hence, modulation efficiency in accordance with the invention.

EXAMPLE 2

A second cell was prepared as described in the preceding example, except that the stripes were 25 µm wide and spaced 25 µm apart, creating 25 µm domains, and the polyimide material on the second substrate was Nissan NI7311. This cell was tested in a Schlieren projection system, wherein the light source was a virtual point source from by imaging the output of a fiber optic source with a relay lens. The optical fiber was fed by a 630 nm red laser. A Schlieren lens imaged the point source onto a single Schlieren output bar blocking the zero order diffraction spot. A projection lens focused the unblocked output of the cell onto a screen from which the measurements were directly taken. This cell had a transmissive optical efficiency of 94% with a contrast ratio of 981:1.

EXAMPLE 3

An optically active light valve may be prepared in accordance with Example 1 wherein the rubbed polyimide alignment layers were replaced with oblique evaporated SiO as follows. The first substrate is subjected to oblique evaporation of SiO at an angle of 85° from the plate normal at a rate of about 10 Å per minute. During the evaporation the vacuum evaporation chamber is maintained at a pressure of $10^{-6}$ Torr. The thickness of the first SiO deposition is thus about 150 Å. The substrate is then masked by photolithography as described in Example 1, with the stripe direction running in the direction of the plane containing the substrate normal and evaporation direction. The substrate is then rotated 180° about its normal, and a second oblique evaporation of SiO is applied in the same manner as the first. The photoresist mask is then removed, thereby exposing alternating domain stripes in which the liquid crystal will be tilted in opposite directions in adjacent domains. The opposite substrate is subjected to a single oblique evaporation under the same conditions as the first evaporation on the first substrate, and the cell assembled with the evaporation directions on opposing substrates orthogonal, and filled with liquid crystal as described.

EXAMPLE 4

A tunable birefringence device may be prepared in accordance with the invention using the rubbing and masking technique described in Example 1. Here both substrates are prepared in the manner described for the first substrate in Example 1 except that the first and second rubs were orthogonal to each other rather than 180°. Once prepared, the opposite substrates are assembled such that the stripes of coaxial rubbing orientations are aligned one above the other on opposing substrates. Thereafter, the cell is vacuum filled with liquid crystal as described.

EXAMPLE 5

A hybrid type tunable birefringence device according to the invention may be prepared by preparing the first substrate by rubbing as described in Example 1, or by oblique evaporation as described in Example 3, except that the first and second rubs or evaporations are orthogonal to each other rather than 180°. The second substrate is then prepared by spin coating a surfactant to promote homeotropic alignment. Thereafter, the cell is assembled in the normal fashion and filled with nematic liquid crystal.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystalline diffractive light modulating device comprising nematic liquid crystal material disposed between first and second transparent substrates defining cell walls and including means for addressing said liquid crystal material, said first substrate being treated to provide a plurality of alignment domains in which the liquid crystal adjacent said first substrate in a first of said alignment domains is oriented in a different rotational direction than the liquid crystal adjacent said first substrate in a second of said alignment domains, said substrates coopertaing with said liquid crystal to form a plurality of liquid crystal domains extending between said first and second substrates wherein the alignment of the liquid crystal adjacent said second substrate is different than the alignment of said liquid crystal adjacent said first substrate, whereby light incident on said first and second alignment domains through one said substrate and in phase, exits said first and second alignment domains through the other of said substrates out of phase, irrespective of the polarization of said incident light.

2. The device according to claim 1 wherein, in said first and second alignment domains, there is an approximately 90° difference in the projection on the cell surface of the liquid crystal director of the liquid crystal approximately midway between said substrates, wherein light incident on said first and second alignment domains through one said substrate and in phase, exits said first and second alignment domains through the other of said substrates approximately 180° out of phase, irrespective of the polarization of said incident light.

3. The device according to claim 1 wherein said means for addressing said liquid crystal material include a continuous transparent electrode disposed on said first substrate.

4. The device according to claim 1 wherein said alignment domains are arranged in alternating, substantially parallel stripes on said first substrate extending substantially across the entire light modulating portion of said device.

5. The device according to claim 1 wherein the liquid crystal adjacent said first substrate in each said first and second alignment domain is tilted at an angle of from about 0.5° to about 25° with respect to said substrate.

6. The device according to claim 1 wherein the liquid crystal molecules adjacent each said first and second substrate in each of said first and second alignment domains are tilted at an angle of from about 0.5° to about 25° with respect to said substrate.

7. The device according to claim 1 wherein said liquid crystal has negative dielectric anisotropy, and said first substrate is treated to promote a tilted homeotropic alignment of said liquid crystal, wherein the projection on the cell surface of the directors of the liquid crystal in said first and second alignment domains are substantially orthogonal, and in a given domain, all lie in substantially the same or parallel planes across the thickness of the cell in the presence of a field.

8. The device according to claim 1 wherein the liquid crystal molecules are homogeneously aligned such that the projection of the directors on the cell surface of the liquid crystal adjacent said first substrate in one of said first and second alignment domains are oriented substantially orthogonally to the projection of the directors on the cell surface, of the liquid crystal adjacent said first substrate in the other of said alignment domains.

9. The device according to claim 1, 7 or 8 wherein said second substrate is treated to promote homeotropic alignment of the liquid crystal, wherein the orientation of the directors of the liquid crystal in a given said first and second alignment domain all lie in substantially the same or parallel planes across the thickness of the cell.

10. The device according to claim 1 wherein said means for addressing said liquid crystal includes an active matrix disposed on said second substrate.

11. The device according to claim 1 wherein the liquid crystal molecules at the surface of said first substrate in said first and second alignment domains are tilted toward each other, and the liquid crystal molecules at the surface of said second substrate are oriented orthogonal to the liquid crystal molecules adjacent said first substrate and have a unidirectional pretilt angle of from about 0.5° to about 25° with respect to said second substrate, whereby in said first and second alignment domains the liquid crystal exhibits a twisted nematic liquid crystal structure having opposite twist sense extending between said first and second substrates.

12. The device according to claim 1 wherein the liquid crystal molecules at the surface of said first substrate in said first and second domains are tilted away from each other and the liquid crystal molecules at the surface of said second substrate are oriented orthogonal to the liquid crystal molecules adjacent said first substrate and have a unidirectional pretilt angle of from about 0.5° to about 25° with respect to said second substrate, whereby in said first and second domains the liquid crystal exhibits a twisted nematic liquid crystal structure having opposite twist sense extending between said first and second substrates.

13. A liquid crystalline diffractive light modulating device comprising nematic liquid crystal material disposed between first and second transparent substrates defining cell wall and including means for addressing said liquid crystal material, said first substrate being treated to provide a plurality of domains in which the projection on the cell surface of the directors of the liquid crystal adjacent said first substrate in a first of said domains are oriented approximately 180° with respect to the projection on the cell surface of the directors of the liquid crystal adjacent said first substrate in a second of said domains, said substrates cooperating with said liquid crystal in said first and second domains to form twisted nematic liquid crystal domains having opposite rotational twist senses extending between said first and second substrates in respective said first and second domains, whereby light incident on said first and second domains through one said substrate and in phase, exits said first and second domains through the other of said substrates out of phase, irrespective of the polarization of said incident light.

14. The device according to claim 13 wherein, in said first and second domains, there is an approximately 90° difference in the projection on the cell surface of the liquid crystal director of the liquid crystal approximately midway between said substrates, whereby light incident on said first and second domains through one said substrate and in phase, exits said domains through the other of said substrates approximately 180° out of phase, irrespective of the polarization of said incident light.

15. The device according to claim 13 wherein said domains are arranged in alternating, substantially parallel stripes on said first substrate extending substantially across the entire light modulating portion of said device.

16. The device according to claim 13 wherein the liquid crystal molecules at the surface of said first substrate in said first and second domains are tilted toward each other.

17. The device according to claim 13 wherein the liquid crystal molecules at the surface of said first substrate in said first and second domains are tilted away from each other.

18. The device according to claim 13 wherein said second substrate is treated to promote homogeneous alignment of said liquid crystal having a unidirectional pretilt angle of from about 0.5° to about 25° with respect to said second substrate.

19. The device according to claim 13 wherein said means for addressing said liquid crystal material include a continuous transparent electrode disposed on one of said first or second substrates.

20. The device according to claim 13 wherein said means for addressing said liquid crystal includes an active matrix disposed on at least one of said first or second substrates.

21. A liquid crystalline diffractive light modulating device comprising nematic liquid crystal material disposed between first and second transparent substrates defining cell walls and including means for addressing said liquid crystal material, said first substrate being treated to provide a plurality of domains in which the projection of the directors on the cell surface of the liquid crystal adjacent said first substrate in a first of said domains are oriented substantially orthogonally to the projection of the directors on the cell surface, of the liquid crystal adjacent said first substrate in a second of said domains, said substrates cooperating with said liquid crystal to form a liquid crystal domain structure extending between said first and second substrates, wherein light incident on said first and second domains through one said substrate and in phase, exits said first and second domains through the other of said substrates out of phase, irrespective of the polarization of said incident light.

22. The device according to claim 21 wherein in a given said first and second domain, said liquid crystal directors all lie in substantially the same or parallel planes across the thickness of the cell, and wherein in said first and second domains, there is an approximately 90° difference in the projection on the cell surface of the liquid crystal director of the liquid crystal approximately midway between said substrates such that light incident on said first and second domains through one said substrate and in phase, exits said first and second domains through the other of said substrates approximately 180° out of phase, irrespective of the polarization of said incident light.

23. The device according to claim 21 wherein said means for addressing said liquid crystal material include a continuous transparent electrode disposed on said first substrate.

24. The device according to claim 21 wherein said domains are arranged in alternating, substantially parallel stripes on said first substrate extending substantially across the entire light modulating portion of said device.

25. The device according to claim 21 wherein the liquid crystal in each said first and second domain adjacent said first substrate is tilted at an angle of from about 0.5° to about 25° with respect to said substrate.

26. The device according to claim 21 wherein said second substrate is treated to provide a plurality domains in which the projection on the cell surface of the directors of the liquid crystal adjacent said second substrate in a first of said domains are oriented substantially orthogonally to the projection on the cell surface of the directors of the liquid crystal adjacent said second substrate in a second said domain, and wherein said first and second domains of said second substrate are disposed with respect to said first and second domains of said first substrate such that the orientation of the directors of the liquid crystal in one said domain all lie in substantially the same or parallel planes across the thickness of the cell.

27. The device according to claim 26 wherein the liquid crystal in each said first and second domain adjacent each said first and second substrate are tilted at an angle of from about 0.5° to about 25° with respect to said substrate.

28. The device according to claim 21 wherein said second substrate is treated to promote homeotropic of the liquid crystal, wherein the orientation of the directors of the liquid crystal in a given said first and second domain all lie in substantially the same or parallel planes across the thickness of the cell.

29. The device according to claim 21 wherein said means for addressing said liquid crystal includes an active matrix disposed on said second substrate.

30. The device according to claim 21 wherein said liquid crystal has negative dielectric anisotropy, and said first substrate is treated to promote a tilted homeotropic alignment of said liquid crystal, wherein the projection on the cell surface of the directors of the liquid crystal at said first substrate in said first and second domains are orthogonal, and in a given said first and second domain, all lie in substantially the same or parallel planes across the thickness of the cell in the presence of a field.

31. The device according to claim 30 wherein said liquid crystal molecules on said first substrate are tilted at an angle of from about 0.5° to about 25° with respect to the substrate normal.

32. A method of making a liquid crystalline diffractive device comprising:
   a) providing first and second substrates to define cell walls, and including means for addressing a liquid crystal material;
   b) treating said first substrate with a first alignment layer to provide at least first and second domains adapted to promote different rotational orientations of a liquid crystal material adjacent in respective said first and second domains;
   c) treating said second substrate with a second alignment layer adapted to promote an orientation of a liquid crystal adjacent said second substrate that is different than the rotational orientations promoted by said first and second domains of said first substrate, and to cooperate with said first alignment layer and a liquid crystal disposed therebetween, to produce liquid crystal domains extending between said substrates; and,
   d) disposing a nematic liquid crystal material between said substrates to form liquid crystal domains extending between said substrates, whereby light incident on said first and second domains through one said substrate and in phase, will exit said first and second domains through the other of said substrates out of phase.

33. The method according to claim 32 comprising treating said first substrate such that said first and second domains of said first alignment layer promote a homogeneous or a tilted homeotropic alignment of adjacent liquid crystal molecules in which said molecules adjacent said first and second domains tilt in the opposite directions.

34. The method according to claim 33 comprising treating said second substrate such that said second alignment layer promotes a unidirectional homogeneous or tilted homeotropic alignment of adjacent liquid crystal molecules in said first and second domains.

35. The method according to claim 32 comprising treating said first substrate such that said first and second domains of said first alignment layer promote a homogeneous or a tilted homeotropic alignment of adjacent liquid crystal molecules in which the projection on the cell surface of the directors of said molecules adjacent said first and second domains are orthogonal.

36. The method according to claim 34 comprising treating said second substrate such that said second alignment layer promotes homeotropic alignment of adjacent liquid crystal molecules.

37. A method of making a liquid crystalline diffractive device comprising:
   a) providing first and second substrates to define cell walls, and including means for addressing a liquid crystal material;
   b) treating said first substrate with a first alignment layer to provide a plurality of domains in which a first said domain will promote a tilted orientation of a liquid crystal material adjacent said domain in one direction, and a second said domain will promote a tilted orientation of a liquid crystal adjacent said domain in an opposite direction;
   c) treating said second substrate with a second alignment layer adapted to cooperate with said first alignment layer and a liquid crystal disposed therebetween, to produce first and second twisted nematic liquid crystal domains having opposite rotational twist senses extending between said substrates in said respective first and second domains; and,
   d) disposing a nematic liquid crystal material between said substrates to form first and second liquid crystal domains extending between said substrates in which the projection of the directors on the substrate surface, of the liquid crystal in said first and second domains is substantially orthogonal,
   whereby light incident on said first and second domains through one said substrate and in phase, exits said first and second domains through the other of said substrates approximately 180° out of phase.

38. The method according to claim 37 wherein said treating of said first substrate comprises coating said substrate with polyimide, unidirectionally rubbing said substrate, masking at least a portion of said substrate and, thereafter, unidirectionally rubbing said substrate in the opposite direction.

39. The method according to claim 37 wherein said treating of said first substrate comprising obliquely evaporating a silicon oxide onto the surface of said substrate, masking at least a portion of said substrate and, thereafter, obliquely evaporating said silicon oxide the opposite direction to said first evaporation.

40. A method of making a liquid crystalline diffractive device comprising:
   a) providing first and second substrates to define cell walls, and including means for addressing a liquid crystal material;
   b) treating said first substrate with a first alignment layer to provide a plurality of domains in which a first said domain will promote an orientation of a liquid crystal material adjacent said domain orthogonally to a liquid crystal orientation promoted by a second said domain;
   c) treating said second substrate with a second alignment layer adapted to cooperate with said first alignment layer and a liquid crystal disposed therebetween, to produce first and second liquid crystal domains extending between said substrates; and,
   d) disposing a nematic liquid crystal material between said substrates to form first and second liquid crystal domains extending between said substrates in which the projection of the directors on the substrate surface, of the liquid crystal in said first and second domains is substantially orthogonal,
   whereby light incident on said first and second domains through one said substrate and in phase, exits said first and second domains through the other of said substrates approximately 180° out of phase.

41. The method according to claim 40 wherein said second substrate is treated to promote homeotropic alignment of said liquid crystal material.

42. The method according to claim 40 wherein said treating of said first substrate comprises coating said substrate with polyimide, unidirectionally rubbing said substrate, masking at least a portion of said substrate and, thereafter, unidirectionally rubbing said substrate in a direction perpendicular to said first rub.

43. The method according to claim 40 wherein said treating of said first substrate comprising obliquely evaporating a silicon oxide of the formula $SiO_x$, wherein x is an integer from one to three, onto the surface of said substrate, masking at least a portion of said substrate and, thereafter, obliquely evaporating said silicon oxide orthogonally to said first evaporation.

44. A liquid crystalline diffractive light modulating device comprising nematic liquid crystal material disposed between first and second substrates, wherein one of said first and second substrates is transparent, defining cell walls and including means for addressing said liquid crystal material, said first substrate being treated to provide a plurality of domains in which the liquid crystal adjacent said first substrate in a first of said domains is oriented in a different rotational direction than the liquid crystal adjacent said first substrate in a second of said domains, said substrates cooperating with said liquid crystal to form a plurality of liquid crystal domains extending between said first and second substrates wherein the alignment of the liquid crystal adjacent said second substrate is different than the alignment of said liquid crystal adjacent said first substrate, whereby light incident on said first and second domains through one said substrate and in phase, exits said first and second domains through the other of said substrates out of phase, irrespective of the polarization of said incident light.

* * * * *